United States Patent
Ueda et al.

(10) Patent No.: US 7,487,661 B2
(45) Date of Patent: Feb. 10, 2009

(54) SENSOR HAVING FREE FALL SELF-TEST CAPABILITY AND METHOD THEREFOR

(75) Inventors: Akihiro Ueda, Chandler, AZ (US); Andrew C. McNeil, Chandler, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 149 days.

(21) Appl. No.: 11/580,419

(22) Filed: Oct. 11, 2006

(65) Prior Publication Data

US 2008/0087085 A1    Apr. 17, 2008

(51) Int. Cl.
*G01P 15/125* (2006.01)
*G01P 21/00* (2006.01)

(52) U.S. Cl. .................. 73/1.39; 360/75; 73/514.32
(58) Field of Classification Search .......... 73/1.38, 73/1.39, 514.32; 360/75
See application file for complete search history.

(56) References Cited

U.S. PATENT DOCUMENTS

| | | | | |
|---|---|---|---|---|
| 5,433,101 | A | * | 7/1995 | Spangler et al. ............... 73/1.39 |
| 5,487,305 | A | * | 1/1996 | Ristic et al. ............... 73/514.32 |
| 6,520,013 | B1 | * | 2/2003 | Wehrenberg ................ 73/489 |
| 6,840,106 | B1 | | 1/2005 | McNeil |
| 6,845,670 | B1 | | 1/2005 | McNeil et al. |
| 6,936,492 | B2 | | 8/2005 | McNeil et al. |
| 2004/0113647 | A1 | | 6/2004 | Deb et al. |

FOREIGN PATENT DOCUMENTS

WO   WO 2004/044518   5/2004

OTHER PUBLICATIONS

International Search Report and Written Opinion related to PCT/US07/7836 dated Jun. 20, 2008.

* cited by examiner

*Primary Examiner*—John E Chapman
(74) *Attorney, Agent, or Firm*—Meschkow & Gresham PLC

(57) ABSTRACT

A transducer (20) includes a movable element (24), a self-test actuator (22), and a sensing element (56, 58). The sensing element (56, 58) detects movement of the movable element (24) from a first position (96) to a second position (102) along an axis perpendicular to a plane of the sensing element (56, 58). The second position (102) results in an output signal (82) that simulates a free fall condition. A method (92) for testing a protection feature of a device (70) having the transducer (20) entails moving the movable element (24) to the first position (102) to produce a negative gravitational force detectable at the sensing element (56, 68), applying a signal (88) to the actuator (22) to move the movable element (24) to the second position (102) by the electrostatic force (100), and ascertaining an enablement of the protection feature in response to the simulated free fall.

14 Claims, 4 Drawing Sheets

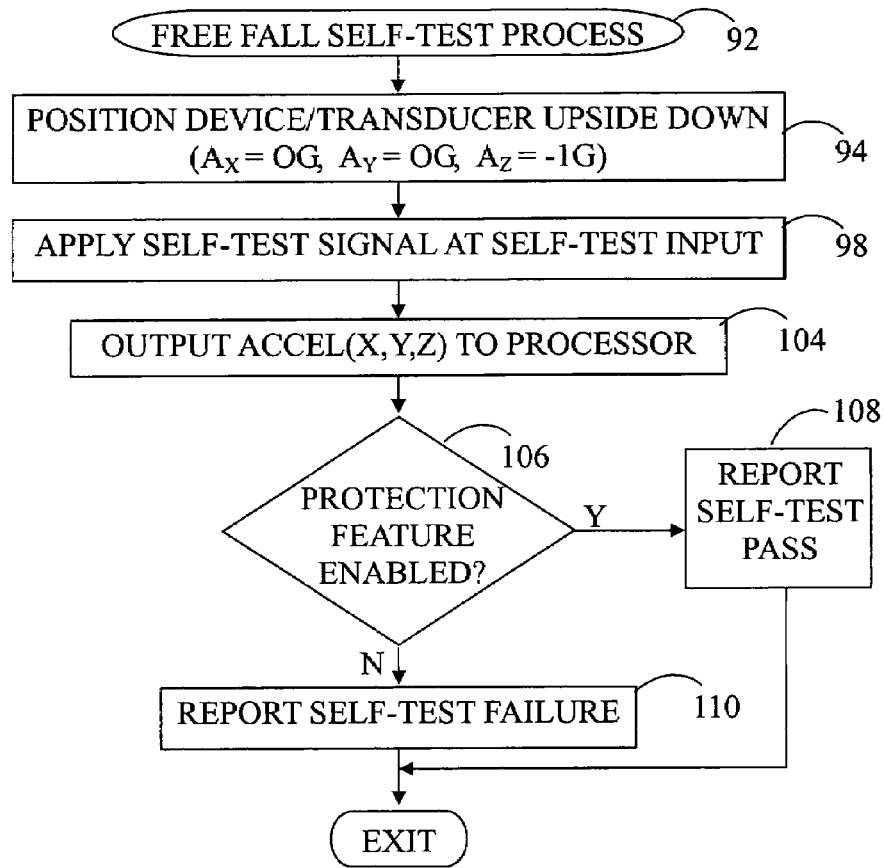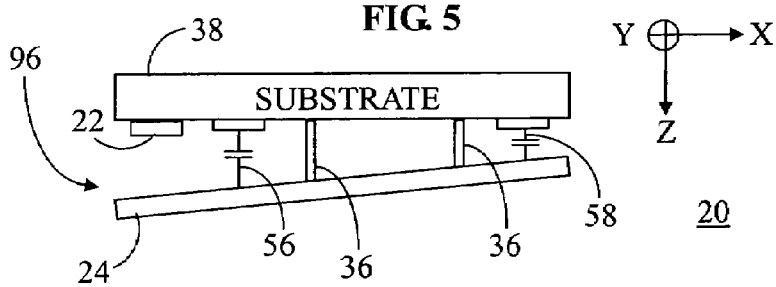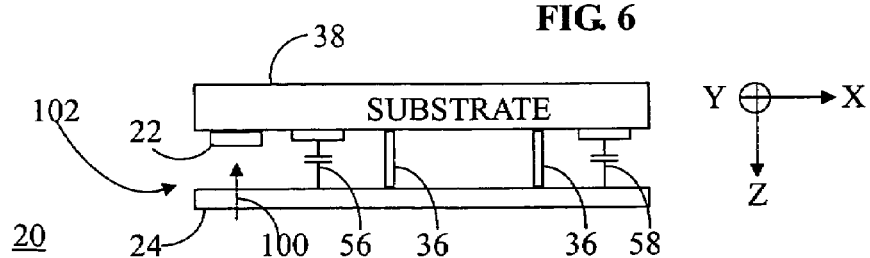

SENSOR HAVING FREE FALL SELF-TEST CAPABILITY AND METHOD THEREFOR

TECHNICAL FIELD OF THE INVENTION

The present invention relates generally to microelectromechanical sensors (MEMS). More specifically, the present invention relates to a transducer having a free fall self-test capability.

BACKGROUND OF THE INVENTION

An accelerometer is a sensor typically utilized for measuring acceleration forces. These forces may be static, like the constant force of gravity, or they can be dynamic, caused by moving or vibrating the accelerometer. An accelerometer may sense acceleration or other phenomena along one, two, or three axes or directions. From this information, the movement or orientation of the device in which the accelerometer is installed can be ascertained.

Accelerometers are used in inertial guidance systems, in airbag deployment systems in vehicles, and many other scientific and engineering systems. One growing use for micro electromechanical system (MEMS) accelerometers is in protection systems for a variety of devices. These protection systems ideally function to safeguard a device from shocks and vibration. Exemplary devices include camcorders, laptop and notebook computers, personal digital assistants (PDAs), cellular telephones, digital audio players, and other such devices that may include a built-in hard disk drive and/or comparable components. Free fall is the falling motion of a device subject to acceleration by gravity. Consequently, a free fall condition occurs when a device is dropped and damage can result when that device eventually strikes a surface. A protection system for safeguarding a device from damage that can occur when a device is dropped may include a MEMS accelerometer that senses a free fall condition. Upon sensing free fall, the protection system may cause power to the device to be automatically turned off and the writing head of the built-in hard disk drive may be disengaged so that a head crash can be avoided when the device strikes a surface.

In some instances, a manufacturer whose product includes a hard disk drive or other such device components may perform a drop test of their product. The drop test may entail dropping the finished product onto a surface to check the functionality of a free fall protection feature. The object of such testing is to ascertain detection of the free fall, and verify that the hard disk drive head and/or other device components are parked or otherwise disengaged upon detection of the free fall. Unfortunately, it can be difficult to conduct a controlled drop test. That is, there may be different results when the product is dropped from different heights, on different surfaces, and whether the product is simply dropped or thrown down. Moreover, such drop testing may scar, scratch, dent, or otherwise break the case of the finished product. Additionally, the drop test could break or shorten the lifespan of other components within the finished product. Accordingly, performing a drop test to ascertain the functionality of a free fall protection feature is difficult to control, time intensive, and costly in terms of damaged products.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 4 shows a flowchart of a free fall self-test process performed to verify the free fall protection feature of the device of FIG. 3;

FIG. 5 shows a block diagram of the transducer of FIG. 1 placed in an upside down position in accordance with the free fall self-test process;

FIG. 6 shows a block diagram of the transducer of FIG. 1 to which a self-test signal is applied;

DETAILED DESCRIPTION

In one embodiment a transducer, which may be, for example, an accelerometer or other sensing device, includes a self-test capability for verifying the free fall protection feature of a device in which the transducer is installed. This free fall self-test capability can be readily and cost effectively incorporated into existing and upcoming micro electromechanical system (MEMS) transducer designs.

Figure 1:
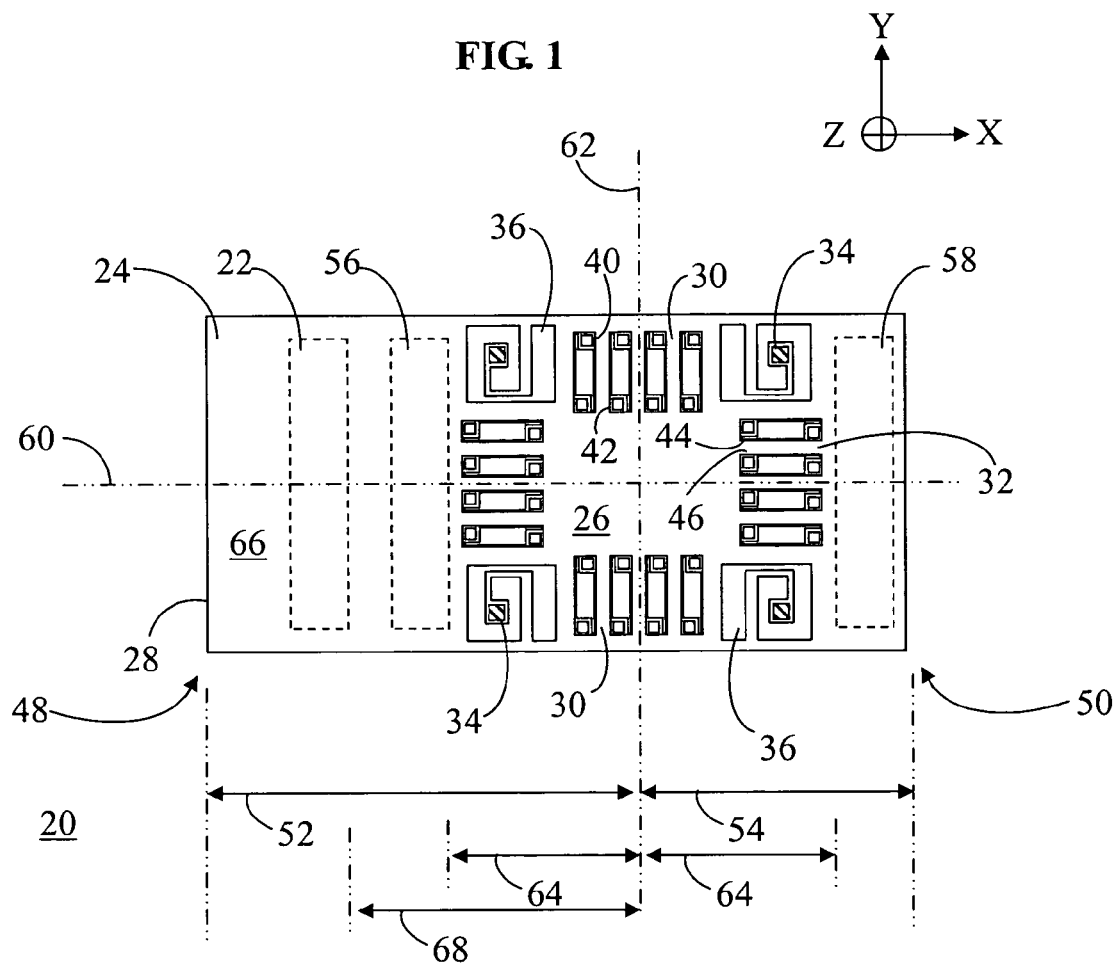
FIG. 1 shows a top view of a transducer that includes a self-test actuator in accordance with a preferred embodiment of the present invention.
Figure 2:
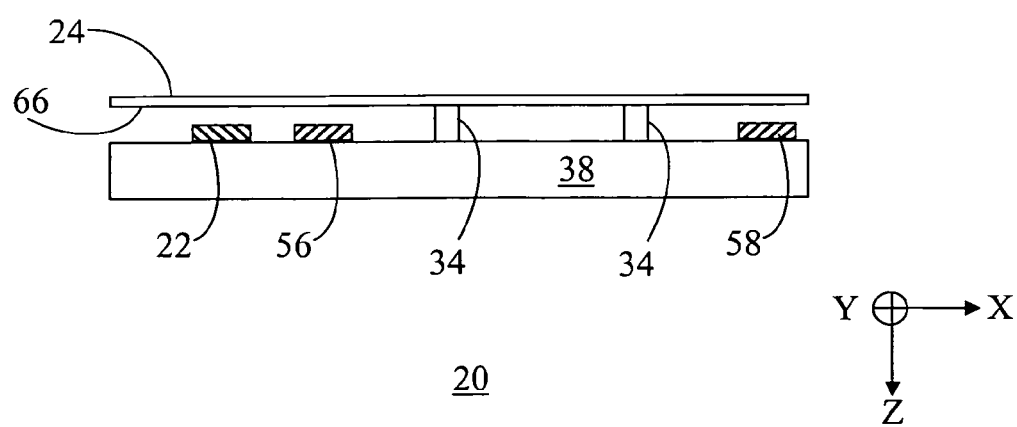
FIG. 2 shows a side view of the transducer of FIG. 1.

Referring to FIGS. 1-2, FIG. 1 shows a top view of transducer 20 that includes a self-test actuator 22 in accordance with a preferred embodiment of the present invention, and FIG. 2 shows a side view of transducer 20. Transducer 20 is a capacitive accelerometer formed as a MEMS chip. Capacitive accelerometers sense a change in electrical capacitance, with respect to acceleration, to vary the output of an energized circuit. Transducer 20 includes a movable element 24 having a central mass 26 which is supported from a frame 28 by X sense fingers 30 and Y sense fingers 32. Frame 28 is, in turn, attached to a plurality of anchors 34 by a series of springs 36 that are preferably compliant in three mutually orthogonal directions. Anchors 34 are mounted on a die or other substrate 38.

Each of X sense fingers 30 is surrounded by two fixed fingers 40 and 42. Similarly, each of Y sense fingers 32 is surrounded by two fixed fingers 44 and 46. When transducer 20 experiences acceleration along the X axis, the distance between the X sense fingers 30 and the adjacent fixed fingers 40 and 42 changes, thus changing the capacitance between these fingers. This change in capacitance is registered by sense circuitry (not shown) and converted to an output signal representative of the acceleration along the X axis. Acceleration along the Y axis is sensed in an analogous manner by registering the change in capacitance between Y sense fingers 32 and the corresponding fixed fingers 44 and 46.

Movable element 24, also known as a proof mass, has first and second opposing sides 48 and 50 which are of unequal mass thereby resulting in an unbalanced proof mass. In accordance with this embodiment, opposing sides 48 and 50 are substantially equal in thickness and width, but unequal in length. That is, first side 48 exhibits a first length 52 that is greater than a second length 54 of second side 50. Consequently, first side 48 has greater mass than second side 50, thus causing movable element 24 to rotate/tilt about the Y axis in response to acceleration along the Z axis. This movement of movable element 24 along the Z axis is sensed by sensing elements, in the form of a first capacitive plate 56 and a second capacitive plate 58, which are disposed upon substrate 38 beneath movable element 24. First and second capacitive plates 56 and 58, respectively, form two capacitors that act in a differential mode, and operate to alter the peak voltage generated by an oscillator when transducer 20 undergoes acceleration in the Z axis. Detection circuitry (not shown) captures this peak voltage which is subsequently processed to a final output signal. When subject to a fixed or constant acceleration, the capacitance value is also a constant, resulting in a measurement signal proportional to static acceleration, also referred to as DC or uniform acceleration.

In transducer 20, X sense fingers 30, Y sense fingers 32, fixed fingers 40, 42, 44, 46, and springs 36 are evenly spaced and are disposed on opposing first and second sides 48 and 50, respectively, of central mass 26 such that the arrangement of these elements has two lines of mirror symmetry, a first line of symmetry 60 corresponding to the X axis and a second line of symmetry 62 corresponding to the Y axis. Such symmetry allows for the effective elimination of cross-axis sensitivities so that, in sensing acceleration along the X and Y axes, transducer 20 senses only the components of acceleration that occur along each of these axes. However, various other configurations for movable element 24 without such symmetry may alternatively be utilized.

First and second capacitive plates 56 and 58, respectively, are generally evenly spaced relative to second line of symmetry 62 and are disposed on opposing first and second sides 48 and 50, respectively. Each of first and second capacitive plates 56 and 58 may be offset in opposing directions from second line of symmetry 62 by a first distance 64. Since first length 52 of first side 48 is greater than second length 54 of second side 50, an unused, or shield area 66 of movable element 24 is formed. Self-test actuator 22 is offset from second line of symmetry 62 by a second distance 68 that is greater than first distance 64. Thus, self-test actuator 22 is supported by substrate 38 beneath the typically unused shield area 66 of movable element 24.

In one embodiment, transducer 20 may be fabricated in accordance with conventional MEMS process technologies, such as, for example, surface micromachining using a number of different materials. Surface micromachining is based on the deposition, patterning, and etching of different structural layers. Surface micromachining enables the fabrication of high-quality MEMS devices because it is based on thin-film technology that combines control and flexibility in fabrication. By way of example, a surface of substrate 38 may be deposited with a conductive material layer. This conductive material can then be masked, patterned, and etched to define first and second capacitive plates 56 and 58, respectively, and self-test actuator 22. Subsequent operations entail the deposition of a sacrificial layer, formation of contact openings, deposition of a second conductive material, masking, patterning, etching, and the like per conventional techniques to produce transducer 20 having a built-in self-test capability, i.e., self-test actuator, for detecting free fall.

Figure 3:
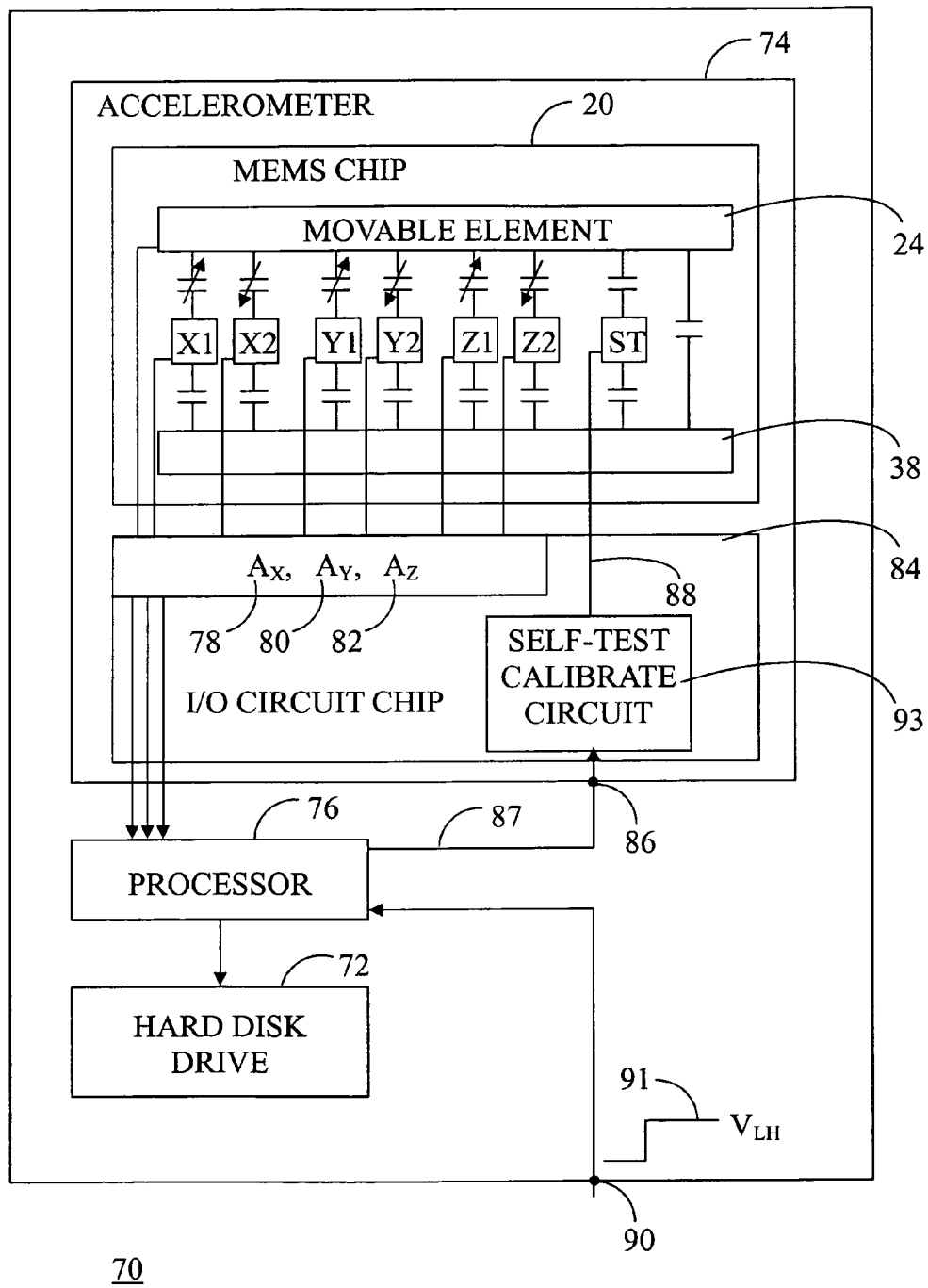
FIG. 3 shows a block diagram of a device having a free fall protection feature that utilizes the transducer of FIG. 1.

FIG. 3 shows a block diagram of a device 70 having a free fall protection feature that utilizes transducer 20. Device 70 can be any of a number of devices that may have an internal hard disk drive 72 and/or other components that should ideally be placed into a "safe mode" when device 70 is dropped and prior to device 70 striking a surface, such as the ground. Such devices include a camcorder, a laptop or notebook computer, a personal digital assistant, a cellular telephone, a digital audio player, and the like. Device 70 includes an accelerometer package 74 into which transducer 20 is incorporated. Accelerometer package 74 is in communication with a processor 76, and processor 76 is in communication with, for example, hard disk drive 72 via conventional bus structures. Those skilled in the art will recognize that device 70 may include many other components that are not discussed herein for brevity.

In general, processor 76 monitors signals from accelerometer package 74. These signals include acceleration along the X, Y, and Z axes. In accordance with the free fall protection feature, should processor 76 receive acceleration signals along all of the X, Y, and Z axes that correspond to a free fall condition (i.e., acceleration is sensed as being approximately 0 G in all three axes), processor 76 will signal hard disk drive 72 to park, or otherwise disengage, its head so as to minimize damage to hard disk drive 72.

Transducer 20 of accelerometer package 74 senses an X axis acceleration ($A_X$) 78, a Y axis acceleration ($A_Y$) 80, and a Z axis acceleration ($A_Z$) 82. X axis acceleration 78, a Y axis acceleration 80, and a Z axis acceleration 82 may be produced from pairs of capacitance signals (ex., X1:X2, Y1:Y2, and Z1:Z2) as known to those skilled in the art. Accelerometer package 74 further includes an input/output (I/O) circuit chip 84 in communication with transducer 20. I/O circuit chip 84 may be a complementary-symmetry/metal-oxide (CMOS) semiconductor having digital signal processors and the like for processing and outputting X axis acceleration 78, a Y axis acceleration 80, and a Z axis acceleration 82. In general, the capacitance signals from MEMS transducer 20 are communicated to circuit chip 84 for suitable processing, as known to those skilled in the art, prior to output to processor 76.

Accelerometer package 74 further includes a self-test input port 86 in communication with processor 76 for application of a digital self-test input signal 87. Digital self-test input signal 87 signals I/O circuit chip 84 to enable a self-test operation mode. In the self-test operation mode, I/O circuit chip 84 applies a self-test signal 88 to self-test actuator 22 (FIG. 2). Self-test signal 88 is a voltage that generates an electrostatic force and simulates an acceleration. Processor 76 may additionally be in communication with a self-test port 90 external to device 70. An external self-test input signal 91 may be communicated to processor 76 to enable the self-test mode. Processor software or hardware on processor 76 subsequently generates digital self-test input signal 87, which is conveyed to self-test input port 86. Self-test port 90 enables a test operator to readily apply external self-test input signal 91 which will cause processor 76 and I/O circuit chip 84 to excite self-test actuator 22 to ascertain the functionality of a free fall protection feature of the finished product, i.e., device 70. However, the presence of self-test port 90 is not a limitation of the present invention. Alternatively, the test operator may open device 70 to access self-test input port 86 at accelerometer package 74.

Self-test signal 91 is desirably a high logic signal. The application of self-test signal 91 causes processor 76 and I/O circuit chip 84 to excite self-test actuator 22 via self-test signal 88. Excitation of self-test actuator 22 causes movable element 24 (FIG. 1) to move by electrostatic force from a first position to a second position during execution of a free fall self-test process, discussed below. This movement is detected by first and second capacitive plates 56 and 58, respectively (FIG. 1), to determine Z axis acceleration 82. During manufacture of accelerometer 74, the magnitude of the self-test effect, i.e., self-test signal 88, can be calibrated. As an example, the magnitude of the self-test effect can be adjusted to 1 G. Calibration is desirable because of variations in manufacturing of package and MEMS chip 20. This calibration is performed by I/O circuit chip 84 which contains adjustable circuit parameters, represented by a self-test calibrate circuit 93, using programmable memory, and so forth. Thus, when accelerometer 74 is installed in system 70, the self-test magnitude will be primarily known.

FIG. 4 shows a flowchart of a free fall self-test process 92 performed to verify the free fall protection feature of device 70 (FIG. 3). In particular, process 92 is performed in the Z axis, i.e., the axis most likely to be subject to gravitational acceleration when device 70 is placed in a nominally upright position. Process 92 is performed to diagnose a free fall detect and protection feature of device 70 without the need for drop testing device 70.

Self-test process 92 begins with a task 94. At task 94, device 70 with the installed accelerometer package 74 (FIG. 3) is placed in an upside down position relative to a nominally upright position of transducer 20 (FIG. 3). In such a position, transducer 20 is oriented such that a negative gravitational field is produced.

Referring to FIG. 5 in connection with task 94, FIG. 5 shows a block diagram of transducer 20 placed in an upside down position. The remainder of device 70 is not shown, but is also upside down when testing is being performed on the final product of device 70. When transducer 20 is retained in a stationary upside down position, movable element 24 rotates/tilts about the Y axis to move to a first position 96. Since transducer 20 is stationary, X axis acceleration 78 is approximately 0 G and Y axis acceleration 80 are approximately 0 G when transducer is place upside down. However, the Z axis of transducer 20 is subject to gravitational force, and Z axis acceleration 82 is sensed as being approximately −1 G due to the movement of movable element 24. Thus, first position 96 corresponds to a negative gravitational position.

With reference back to FIG. 4, self-test process 92 proceeds to a task 98 following positioning task 94. At task 98, self-test signal ($V_{LH}$) 88 (FIG. 3) is applied at self-test input 86 (FIG. 3) desirably via self-test port 90 (FIG. 3).

Referring to FIG. 6 in connection with task 98, FIG. 6 shows a block diagram of the transducer 20 to which a self-test signal 88 is applied. As mentioned previously, self-test signal 88 is a high logic signal. Following trimming at self-test calibrate circuit 92 (FIG. 3), application of self-test signal 88 at self-test actuator 22 produces an electrostatic force 100 between movable element 24 and self-test actuator 22. Electrostatic force 100 has a magnitude generally corresponding to acceleration due to gravity, i.e. 1 G. Thus, electrostatic force 100 causes movable element 24 to rotate/tilt about the Y axis to move to a second position 102. Again, since transducer 20 is stationary, X axis acceleration 78 and Y axis acceleration 80 remain approximately 0 G. However, when subjected to electrostatic force 100, Z axis acceleration 82 changes from the former −1 G to approximately 0 G. Thus, second position 102 corresponds to a neutral gravitational position. This neutral gravitational position simulates a free fall condition in which the accelerometer signals (0 G in all three axes) are generally the same as those that would occur when device 70 is dropped.

With reference back to FIG. 4, self-test process 92 proceeds to a task 104 following task 98. At task 104, transducer signals, i.e., X axis acceleration ($A_X$) 78, Y axis acceleration ($A_Y$) 80, and Z axis acceleration ($A_Z$) 82, all of which are 0 G, are output from accelerometer package 74 (FIG. 3) to processor 76 (FIG. 3) of device 70 (FIG. 3). Processor 76 subsequently detects X axis acceleration ($A_X$) 78, Y axis acceleration ($A_Y$) 80, and Z axis acceleration ($A_Z$) 82.

A query task 106 is performed in response to task 104. At query task 106, a determination is made as to whether the free fall protection feature of device 70 is enabled in response to detection at processor 76 of X axis acceleration ($A_X$) 78, Y axis acceleration ($A_Y$) 80, and Z axis acceleration ($A_Z$) 82. Enablement of the free fall protection feature may be ascertained by, for example, verifying that the head of hard disk drive 72 (FIG. 3) is parked or otherwise disengaged when X axis acceleration ($A_X$) 78, Y axis acceleration ($A_Y$) 80, and Z axis acceleration ($A_Z$) 82 are all 0 G.

When query task 106 ascertains enablement of the free fall protection feature of device 70, process 92 proceeds to a task 108. At task 108, a report may optionally be generated, either manually by the test operator or automatically at device 70, indicating that device 70 passed its self-test. Free fall self-test process 92 exits following task 108.

Conversely, when query task 106 determines that the free fall protection feature of device 70 was not enabled in the presence of the simulated free fall condition, process 92 proceeds to a task 110. At task 110, a report may optionally be generated, either manually or automatically, indicating that device 70 failed its self-test. Free fall self-test process 92 exits following task 110. Thus, process 92 provides a method for testing a protection feature of device 70 without having to subject device 70 to the potentially damaging and costly effects of a drop test.

Free fall self-test apparatus and methodology are described above in connection with an unbalanced proof mass (movable element 24) of a three axis capacitive accelerometer in which self-test actuator 22 is disposed beneath an unused shield portion 66 (FIG. 1) of movable element 24. However, the present invention may alternatively be implemented in a single or dual axis accelerometer, with a wide variety of X and Y sensing element arrangements, and/or in a device that includes multiple proof masses. Additionally, in an alternative embodiment, the free fall self-test apparatus and methodology may be implemented when acceleration sensing along the Z axis employs a symmetric arrangement, i.e. a balanced proof mass.

Figure 7:
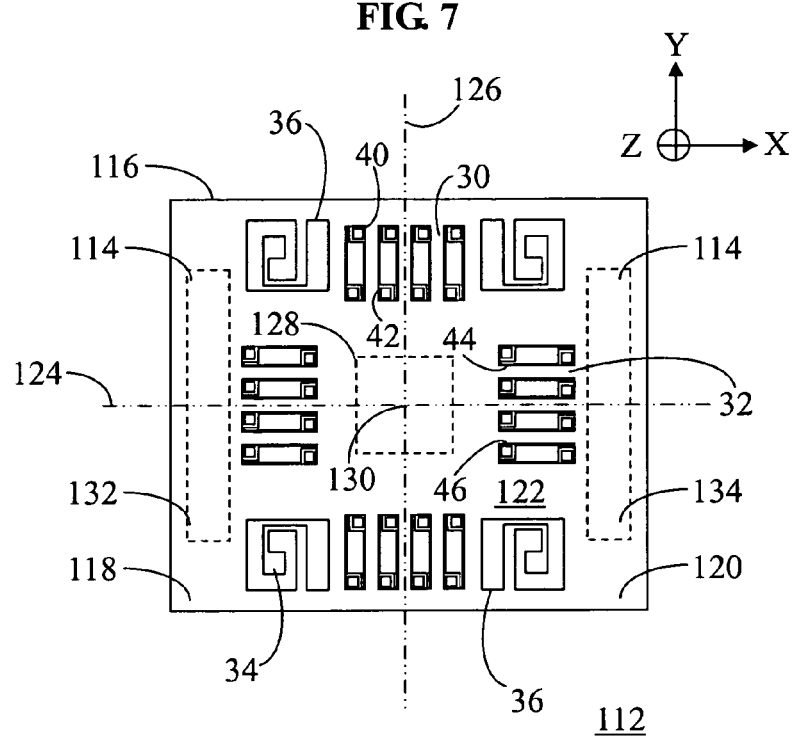
FIG. 7 shows a top view of a transducer that includes a self-test actuator in accordance with an alternative embodiment of the present invention.

FIG. 7 shows a top view of a transducer 112 that includes a self-test actuator 114 in accordance with an alternative embodiment of the present invention. In particular, transducer 112 exhibits a symmetrical arrangement in which a movable element 116 has first and second opposing sides 118 and 120, respectively, which are generally of equal mass. In accordance with this embodiment, opposing sides 118 and 120 are substantially equal in thickness, width, and length thereby resulting in a balanced proof mass.

Additionally, in transducer 112, X sense fingers 30, Y sense fingers 32, fixed fingers 40, 42, 44, 46, and springs 36 are evenly spaced and are disposed on opposing first and second sides 118 and 120, respectively, of a central mass 122 of movable element 116 such that the arrangement of these elements has two lines of mirror symmetry, a first line of mirror symmetry 124 corresponding to the X axis and a second line of symmetry 126 corresponding to the Y axis.

Since movable element 116 is balanced, movable element 116 generally moves parallel to the Z axis in response to acceleration along the Z axis, rather than rotating/tilting about the Y axis as in transducer 20 (FIG. 1). Consequently, a sensing element, in the form of a capacitive plate 128, may be disposed beneath movable element 116 at a central location 130 defined by an intersection of first and second lines of symmetry 124 and 126, respectively. This movement of movable element 116 along the Z axis is sensed by capacitive plate 128. A change in capacitance between capacitive plate 128 and a fixed capacitor (not shown) located apart from movable element 116 (ex., on a rigid plate of transducer 112) can be registered by sense circuitry (not shown) and converted to an output signal representative of the acceleration along the Z axis.

In accordance with the balanced movable element 116 and central location 130 of capacitive plate 128, self-test actuator 114 is symmetrically disposed on movable element 116 relative to first and second lines of symmetry 124 and 126. In this exemplary embodiment, self-test actuator 114 includes a first portion 132 and a second portion 134. First and second portions 132 and 134, respectively, of self-test actuator 114 are symmetrically disposed on a substrate 136 (shown in FIGS. 8-9) about center location 130. That is, first and second portions 132 and 134 are located at the same locations on corresponding first and second opposing sides 118 and 120, respectively, relative to first and second lines of symmetry 124 and 126. The purpose of this symmetrical arrangement will become apparent in the following discussion.

Figure 8:
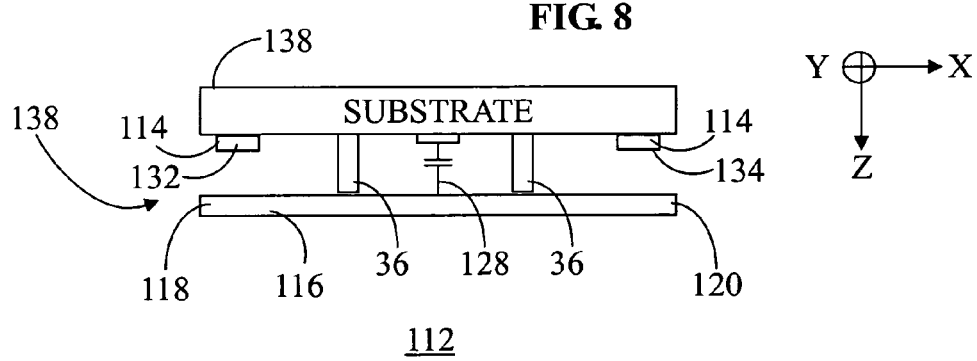
FIG. 8 shows a block diagram of the transducer of FIG. 7 placed in an upside down position in accordance with the free fall self-test process.

FIG. 8 shows a block diagram of transducer 112 placed in an upside down position in accordance with task 94 (FIG. 4) of free fall self-test process 92 (FIG. 4). When transducer 112 is retained in a stationary upside down position, movable element 116 moves parallel to the Z axis to a first position 138 farther away from substrate 136 than when transducer 112 is retained in a nominally upright position. Due to the balanced nature of movable element 116, when transducer 112 is positioned upside down, first and second sides opposing sides 118 and 120 of movable element 116 are spaced equally away from substrate 136 in response to acceleration due to gravity. Since transducer 112 is stationary, X axis acceleration 78 and Y axis acceleration 80 are each approximately 0 G in first position 138. However, Z axis acceleration 82 is subject to a gravitational force of approximately −1 G as sensed at capacitive plate 128 relative to a fixed capacitor (not shown).

Figure 9:
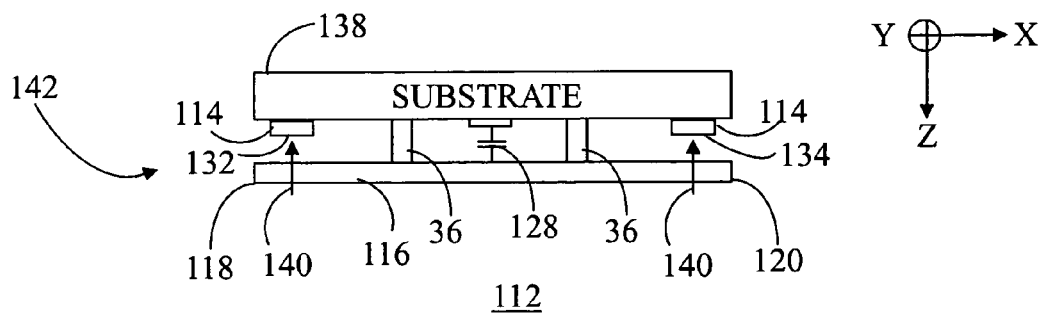
FIG. 9 shows a block diagram of the transducer of FIG. 7 to which a self-test signal is applied in accordance with the free fall self-test process.

FIG. 9 shows a block diagram of transducer 112 to which self-test signal 88 (FIG. 3) is applied in accordance with task 98 (FIG. 4) of free fall self-test process (FIG. 4). Following trimming at self-test calibrate circuit 92 (FIG. 3), application of self-test signal 88 at first and second portions 132 and 134, respectively, of self-test actuator 114 produces an electrostatic force 140 between movable element 116 and first and second portions 132 and 134 of self-test actuator 114. Electrostatic force 140 has a magnitude generally corresponding to acceleration due to gravity, i.e. 1 G. Thus, electrostatic force 140 causes movable element 116 to move generally parallel to the Z axis to a second position 142 toward substrate 136. Since transducer 112 is stationary, X axis acceleration 78 and Y axis acceleration 80 remain approximately 0 G when movable element 116 moves to second position 142. However, Z axis acceleration 82, subject to electrostatic force 140, becomes approximately 0 G. Thus, second position 142 corresponds to the neutral gravitational position simulating a free fall condition in which the accelerometer signals (0 G in all three axes) are the same as those that would occur when device 70 is dropped. Accordingly, verification of the enablement of a free fall self-test protection system can be ascertained within a device in which transducer 112 is installed.

An embodiment described herein comprises a device that includes a transducer having a free fall self-test capability. Another embodiment comprises a method for testing a free fall protection feature of a device having a transducer adapted to sense free fall. The transducer may be an accelerometer or other sensing device that includes a self-test actuator at which an electrostatic force can be imposed. When the transducer is placed in the appropriate position and the electrostatic force is imposed, the transducer produces a static acceleration signal corresponding to 0 G, to simulate a free fall condition. This free fall condition is communicated to a processing element of a device. The processing element can then enable a free fall protection system to safeguard certain device components, such as a hard disk drive, from damage. This free fall self-test capability can be readily and cost effectively incorporated into existing and upcoming micro electromechanical system (MEMS) transducer designs. For example, the self-test actuator may be incorporated into the unused shield area of pre-existing unbalanced proof mass implementations without a commensurate increase in the die area of such a device. In addition, the free fall self-test capability eliminates the need for damaging and costly drop testing of finished products at a manufacturer premise.

Although the preferred embodiments of the invention have been illustrated and described in detail, it will be readily apparent to those skilled in the art that various modifications may be made therein of the without departing from the spirit invention or from the scope of the appended claims. For example, although the self-test actuator is energized to produce an electrostatic force that results in a 0 G signal on a Z axis component of an accelerometer, the same or different force may alternatively be used to verify the function of the Z axis component of the accelerometer package and/or the function of the X axis and Y axis components of the accelerometer.

What is claimed is:

1. A device comprising:
   a transducer, the transducer comprising:
      a movable element;
      a self-test actuator disposed proximate said movable element for providing an electrostatic force to move said movable element from a negative gravitational position to a neutral gravitational position, said neutral gravitational position simulating free fall; and
      a sensing element disposed beneath said movable element, said sensing element being adapted to detect movement of said movable element from said negative gravitational position to said neutral gravitational position along an axis perpendicular to a plane of said sensing element.

2. A device as claimed in claim 1 wherein said electrostatic force has a magnitude corresponding to an acceleration due to gravity.

3. A device as claimed in claim 1 wherein said sensing element comprises a capacitive plate adapted to sense acceleration along said axis.

4. A device as claimed in claim 1 wherein said axis is a first axis, and said movable element comprises first and second sets of fingers adapted to sense acceleration along second and third mutually orthogonal axes, said second and third axes being orthogonal to said first axis.

5. A device as claimed in claim 1 wherein said transducer further comprises a substrate, and said self-test actuator is supported on said substrate beneath said movable element.

6. A device as claimed in claim 1 wherein said sensing element is a first sensing element, and said transducer further comprises a second sensing element disposed beneath said movable element, said first and second sensing elements functioning to detect said movement of said movable element.

7. A device as claimed in claim 6 wherein said transducer further comprises a substrate, said movable element is mounted on said substrate, said first and second sensing elements are supported by said substrate beneath said movable element, and said first and second sensing elements are disposed in an arrangement that has a line of mirror symmetry.

8. A device as claimed in claim 7 wherein said first sensing element is offset a first distance from said line of symmetry, and said self-test actuator is supported by said substrate beneath said movable element, said self-test actuator being offset a second distance from said line of symmetry, said second distance being greater than said first distance.

9. A device as claimed in claim 1 wherein said transducer further comprises a substrate, said movable element is mounted on said substrate and said sensing element is disposed beneath a center location of said movable element.

10. A device as claimed in claim 9 wherein said self-test actuator comprises first and second portions that are symmetrically disposed on said substrate about said center location.

11. A method for testing a protection feature of a device having a transducer adapted to sense free fall, said transducer including a movable element, a self-test actuator disposed proximate said movable element, and a sensing element disposed beneath said movable element, said method comprising:

moving said movable element to a first position, said first position producing a negative gravitational force detectable at said sensing element;

applying a self-test signal to said self-test actuator to move said movable element to a second position by electrostatic force, said second position simulating said free fall; and ascertaining an enablement of said protection feature in response to said simulated free fall.

12. A method as claimed in claim 11 further comprising sensing, at said sensing element, acceleration due to gravity along an axis perpendicular to a plane of said sensing element in response to said applying operation.

13. A method as claimed in claim 12 wherein said axis is a first axis, said movable element includes a first set of fingers aligned along a second axis and a second set of fingers aligned along a third axis, said first, second, and third axes being mutually orthogonal, and said method further comprises sensing acceleration along said second and third axes.

14. A method as claimed in claim 11 further comprising:

outputting from said transducer a signal corresponding to said second position;

detecting said signal at said device; and verifying said enablement of said protection feature of said device in response to detection of said signal.

\* \* \* \* \*